US010480614B2

(12) United States Patent
Cailleret et al.

(10) Patent No.: US 10,480,614 B2
(45) Date of Patent: Nov. 19, 2019

(54) DEVICE FOR FILTERING VIBRATIONS

(71) Applicant: VALEO EMBRAYAGES, Amiens (FR)

(72) Inventors: Franck Cailleret, Amiens (FR); Michael Hennebelle, Houdain (FR); Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 440 days.

(21) Appl. No.: 15/186,819

(22) Filed: Jun. 20, 2016

(65) Prior Publication Data

US 2016/0369866 A1 Dec. 22, 2016

(30) Foreign Application Priority Data

Jun. 18, 2015 (FR) ...................................... 15 55576

(51) Int. Cl.
*F16F 15/14* (2006.01)
*F16F 15/134* (2006.01)

(52) U.S. Cl.
CPC .... *F16F 15/1428* (2013.01); *F16F 15/13484* (2013.01)

(58) Field of Classification Search
CPC .......... F16D 3/12; F16D 3/14; F16D 2300/22; F16F 15/123; F16F 15/12313; F16F 15/1232; F16F 15/12326; F16F 15/1234; F16F 15/12353; F16F 15/13121; F16F 15/13164; F16F 15/134; F16F 15/1343; F16F 15/13438; F16F 15/13469; F16F 15/13484; F16F 15/137; F16F 15/1421; F16F 15/1428; F16F 15/145; F16F 15/1457; F16H 45/02; F16H 2045/0221; F16H 2045/0226; F16H 2045/0231
(Continued)

(56) References Cited

U.S. PATENT DOCUMENTS 5,348,127 A * 9/1994 Murata ................. F16F 15/134
192/3.3
5,388,678 A * 2/1995 Murata ................... F16H 45/02
192/3.29
(Continued)

FOREIGN PATENT DOCUMENTS

| DE | 102008053377 A1 | 5/2009 |
| DE | 102012218918 A1 | 4/2014 |
| WO | WO2014123174 A1 | 8/2014 |

*Primary Examiner* — Josh Skroupa
(74) *Attorney, Agent, or Firm* — Berenato & White, LLC

(57) ABSTRACT

An inertial deflector (1) for a motor vehicle transmission system. The inertial deflector comprises a support member (7) intended to be associated with an element (3) of the transmission system and to be driven rotationally around an axis X, an inertia mass (8) mounted rotationally movably on the support member (7) around the axis X, and helical springs (9) arranged along a circumferential direction and elastically rotationally coupling the support member (7) and the inertia mass (8). Each of the helical springs (9) is received in a receiving space that is delimited between on the one hand a recess (22) configured in the inertia mass (8) and radially and axially guiding the helical spring, and on the other hand a rim zone (23) of the support member (7) covering the recess (22) in order to axially retain the helical spring (9) in the recess (22).

17 Claims, 7 Drawing Sheets

(58) Field of Classification Search
USPC ....... 464/67.1, 68.1, 68.4, 68.41, 68.7, 68.8, 464/68.9, 68.92
See application file for complete search history.

(56) References Cited

U.S. PATENT DOCUMENTS

| | | | | |
|---|---|---|---|---|
| 5,636,718 | A * | 6/1997 | Nomoto | F16H 45/02 192/213.2 |
| 5,695,032 | A * | 12/1997 | Murata | F16D 25/0635 192/213.1 |
| 6,026,776 | A * | 2/2000 | Winberg | F16C 3/20 123/192.1 |
| 8,627,934 | B2 * | 1/2014 | Murata | F16H 45/02 192/3.25 |
| 9,618,105 | B2 * | 4/2017 | Kawahara | F16F 15/134 |
| 9,784,352 | B2 * | 10/2017 | Tomiyama | F16F 15/12353 |
| 9,915,329 | B2 * | 3/2018 | Kawahara | F16H 45/02 |
| 10,030,740 | B2 * | 7/2018 | Tomiyama | F16H 45/02 |
| 2013/0206529 | A1 | 8/2013 | Tomiyama | |
| 2015/0337920 | A1 | 11/2015 | Kawahara | |
| 2016/0186835 | A1 | 6/2016 | Dogel et al. | |
| 2017/0234416 | A1 * | 8/2017 | Kawahara | F16H 45/02 192/3.28 |

* cited by examiner

DEVICE FOR FILTERING VIBRATIONS

CROSS-REFERENCE TO RELATED APPLICATIONS AND CLAIM TO PRIORITY

This application is related to Patent Application No. 1555576 filed Jun. 18, 2015 in France, the disclosure of which is incorporated herein by reference and to which priority is claimed.

FIELD OF THE INVENTION

The invention relates to the field of devices for filtering vibrations which are intended to be part of motor vehicle transmissions, and relates more particularly to the field of inertial deflectors.

BACKGROUND OF THE INVENTION

Combustion engines do not generate a constant torque, and exhibit irregularities caused by the successive combustion events in their cylinders. These irregularities generate vibrations that are capable of being transmitted into the gearbox, thereby causing therein particularly undesirable impacts, noise, and acoustic annoyances.

Motor vehicle transmissions thus have vibration filtering devices located upstream from the gearbox, in order to reduce the undesirable effects of vibrations and to improve the driving comfort of the motor vehicles.

Filtering devices of the inertial deflector type, which allow vibrations to be filtered selectively for a specific frequency range, are known. The inertial deflectors are generally tuned to filter vibrations for a given frequency corresponding to a resonant frequency of the transmission system.

As an example, the document US 2013 206529 discloses a transmission system equipped with an inertial deflector. The latter has an inertia mass that is fastened onto two guide washers, a web that is on the one hand arranged axially between the two guide washers and on the other hand is rotationally integral with a hub having splines intended to interact with an input shaft of a gearbox, and helical springs acting against the relative rotation of the guide washers with respect to the web. The guide washers and the web each have circumferentially oriented windows that are each intended to receive a helical spring. The circumferential ends of the windows have radial zones that constitute abutment seats intended for abutment of the ends of the helical springs. The windows configured in the guide washers have curved inner and outer edges allowing radial and axial retention of the elastic members. An inertial deflector of this kind has numerous elements, so that it is complex and expensive to manufacture.

SUMMARY OF THE INVENTION

An idea on which the invention is based is to eliminate the drawbacks of the existing art by proposing an inertial deflector that is particularly simple.

According to an embodiment the invention provides an inertial deflector for a motor vehicle transmission system, having a support member intended to be associated with an element of the transmission system and to be driven rotationally around an axis X, an inertia mass mounted rotationally movably on the support member around said axis X, and helical springs arranged along a circumferential direction and elastically rotationally coupling the support member and the inertia mass; at least one of the helical springs is received in a receiving space that is delimited between on the one hand a recess configured in the inertia mass, and on the other hand a rim zone of the support member, said recess and said rim zone being configured with respect to one another so as to retain the helical spring in said recess.

An inertial deflector of this kind thus has a simpler structure than inertial deflectors of the existing art, since the function of axially and radially guiding the spring is performed directly by the inertial deflector and its support member; this allows the number of elements constituting said inertial deflector to be limited.

According to other advantageous embodiments an inertial deflector of this kind can exhibit one or more of the following characteristics:

Each of the helical springs is received in the receiving space.

The recess configured in the inertia mass guides each helical spring radially and axially, and the rim zone covers said recess in order to axially retain said helical spring.

The recess configured in the inertia mass is constituted by an annular channel extending circumferentially around the axis X.

The inertia mass is a one-piece part, made for example of cast iron.

The inertia mass has an annular part, made for example of cast iron, and a plurality of sectors made of sheet metal fastened to said annular part and extending radially, each of said sectors having an indented zone constituting, with an inner edge of the annular part, the recess of the inertia mass.

The support member has an indented annular zone defining an axially oriented guidance surface, said guidance surface interacting with a complementary guidance surface constituted on an inner edge of the inertia mass so as to center and rotationally guide the inertia mass on the support member.

The inertia mass is retained axially on the support member by means of a plurality of pegs each passing through a cylindrical bore configured in the inertia mass and a circumferentially oriented opening configured in the support member.

The bores configured in the inertia mass are smooth bores, and each peg has a first end provided with a head and a second end provided with an annular channel in which an elastic clip is mounted, the inertia mass and the support member being sandwiched between the head and the elastic clip.

The inertia mass has, along the extension of the bore, a counterbore allowing the elastic clip to be countersunk. According to an embodiment the counterbore can have a conical shape, so that an axial surface application force is created.

The support member has, along the extension of its guidance surface, a plurality of tongues, and the guidance surface configured on the inertia mass is bordered axially by an annular bead projecting radially inward and interacting with the tongues in order to axially retain the inertia mass on the support member.

The helical springs are capable of becoming interposed between the abutment elements integral respectively with the support member and the inertia mass.

Each of the ends of the helical springs has a abutment cup that extends inside said helical springs, and an abutment surface against which at least one abutment element integral with the inertia mass or with the support member comes into abutment.

Each helical spring is interposed circumferentially between two abutment elements rotationally integral with the inertia mass and between two abutment elements rotationally integral with the support member. Each abutment element rotationally integral with the inertia mass is constituted by a pair of axially oriented pins that are spaced radially from one another and are press-fitted into a bore constituted in the inertia mass, and each abutment element rotationally integral with the support member is an abutment tab bent over in an axial orientation and arranged radially between the two pins of one of the pairs.

The helical springs are associated pairwise, each of the helical springs having a first end facing the other helical spring of the pair and a second opposite end; and an abutment element integral with one element among the inertia mass and the support member being interposed between the first ends of the helical springs of each pair, and two abutment elements rotationally integral with the other element among the inertia mass and the support member interacting respectively with the second ends of the one and the other of the helical springs of the pair, each of the helical springs being pre-stressed between an abutment element rotationally integral with the inertia mass and an abutment element rotationally integral with the support member.

The abutment elements interposed between the mutually facing ends of the two springs of each pair are each constituted by an abutment pin that is press-fitted into a bore configured on the inertia mass.

The support member has, in its rim zone, recesses that end up covering the annular channel in the annular sectors in which the helical springs are located, and the abutment elements interacting with the second ends of the springs are constituted by the circumferential ends of each recess.

According to an embodiment the invention likewise provides a torque transmission device intended to transmit a torque between a crankshaft and an input shaft of a gearbox, having an aforementioned inertial deflector.

According to an advantageous variant embodiment the torque transmission device comprises a hub having splines intended to interact with complementary splines configured on the input shaft of the gearbox, and the support member is fastened to said hub.

According to an embodiment the invention also provides a transmission system comprising a transmission device recited above and a cylinder deactivation engine, and the inertial deflector has no friction device configured to exert a resisting frictional torque acting against the relative deflection between the inertia mass and the support member.

BRIEF DESCRIPTION OF THE DRAWINGS

The invention will be better understood, and other objectives, details, characteristics, and advantages thereof will emerge more clearly, in the course of the description below of several specific embodiments of the invention, provided solely for illustrative and not limiting purposes and referring to the attached Figures.

DETAILED DESCRIPTION OF THE PREFERRED EMBODIMENT(S)

In the description and the claims the terms "outer" and "inner," as well as the orientations "axial" and "radial," will be used to designate elements of the inertial deflector or of the torque transmission device in accordance with the definitions given in the description. By convention, the "radial" orientation is directed orthogonally to the rotation axis X of the inertial deflector which determines the "axial" orientation; and, moving from inside to outside away from said axis X, the "circumferential" orientation is directed orthogonally to the axis X and orthogonally to the radial direction. The terms "outer" and "inner" are used to define the relative position of one element with respect to another with reference to the axis X; an element close to the axis is thus referred to as "inner" as opposed to an "outer" element located radially at the periphery.

Figure 1:
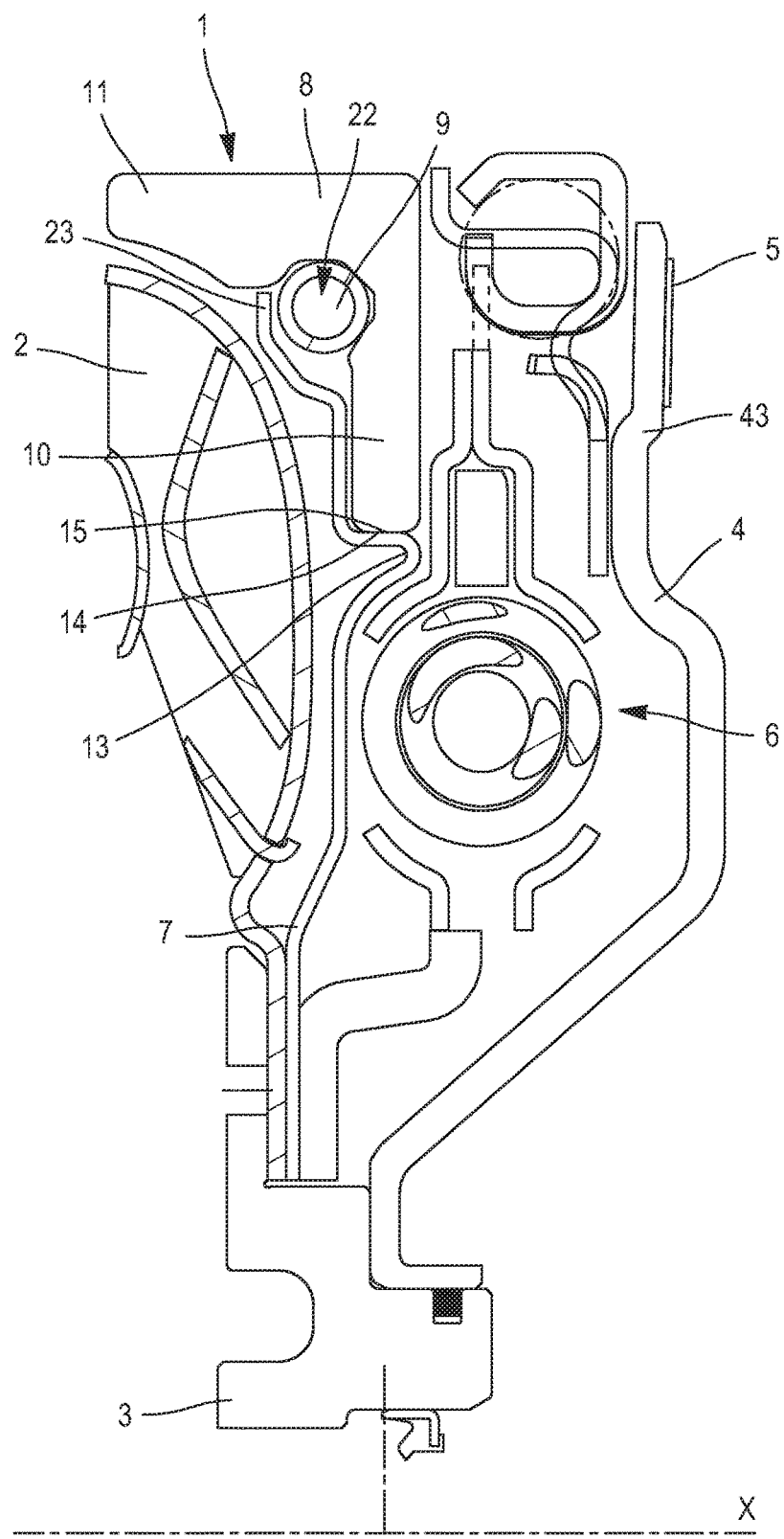
FIG. 1 is a half section view of an inertial deflector according to a first embodiment, integrated with a hydrodynamic torque converter.
Figure 2:
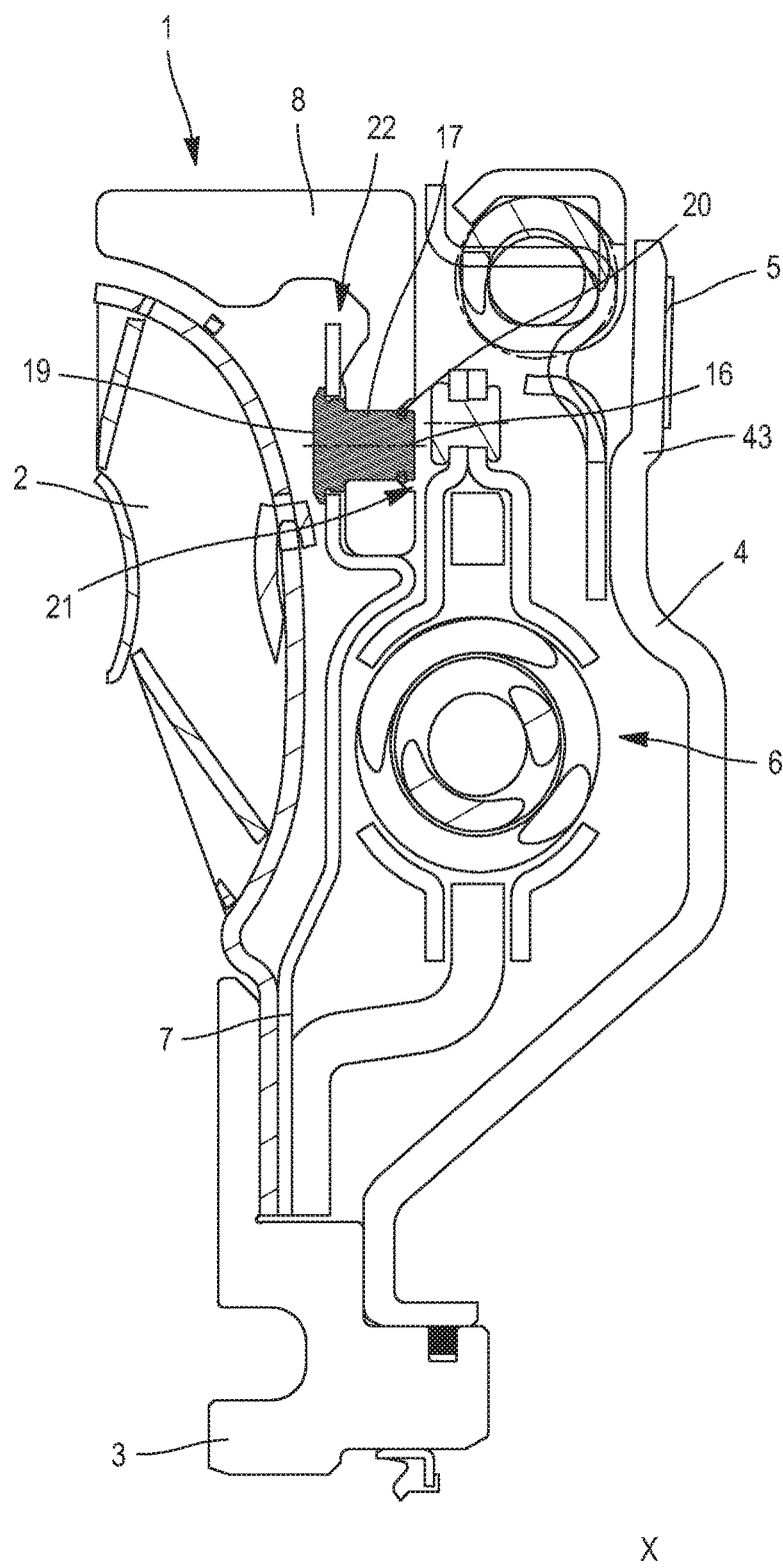
FIG. 2 is a half section view of the inertial deflector of FIG. 1 along another section plane.

Referring to FIGS. 1 and 2, these show an inertial deflector 1 that is integrated into a hydrodynamic torque converter.

A hydrodynamic torque converter allows transmission of a torque between the crankshaft of a combustion engine and the input shaft of the gearbox (not depicted), and has a housing (not depicted) that is fastened to the crankshaft, a bladed impeller wheel (not depicted) rotationally integral with the housing, and a bladed turbine wheel 2 capable of being hydrokinetically driven by the bladed impeller wheel by means of a reactor (not depicted). Turbine wheel 2 is fastened on a hub 3 that has internal splines capable of interacting with complementary splines configured at the end of the gearbox input shaft.

The hydrodynamic torque converter also has a bypass clutch 43, also called a "lockup" clutch. Bypass clutch 43 has a piston 4 that is equipped with a friction lining 5 and is movable axially between a disengaged position and an engaged position, also called a "bypass position," in which the friction lining comes into axial abutment against a reaction surface constituted on the inner face of a transverse wall of the housing (not depicted). Piston 4 of bypass clutch 43 is rotationally coupled to the hub by means of an elastic-member damping device 6.

When bypass clutch 43 is in its disengaged position, torque is thus transmitted hydrokinetically from the combustion engine to the gearbox input shaft via the impeller wheel and turbine wheel 2. Conversely, when bypass clutch 43 is in its bypass position, torque is transmitted between the crankshaft of the combustion engine and the gearbox input shaft through bypass clutch 43, short-circuiting the hydrokinetic transmission, i.e. without involving impeller wheel 3 and turbine wheel 2. The function of elastic-member damping device 6 is to damp vibrations between the crankshaft and the gearbox input shaft when bypass clutch 43 is in the bypass position and torque is consequently being transmitted through bypass clutch 43.

Inertial deflector 1 has a support member 7, annular in shape and coaxial with the axis X, which is rotationally integral with hub 3, and an inertia mass 8 mounted rotationally movably on support member 7 around said axis X. Inertial deflector 1 furthermore has helical springs 9 that act against a rotation of inertia mass 8 with respect to support member 7 when the latter are in their relative rest position. An inertial deflector 1 of this kind thus constitutes a mass/spring system acting in parallel with the transmission system of the motor vehicle. In other words, inertia mass 8 is not arranged in the torque transmission path but is coupled to an element through which torque transits, so that the inertial deflector is excited by the vibrations transiting through the transmission system. For a range of filtering frequencies around the anti-resonant frequency of the inertial deflector, the latter is thus capable of generating a torque opposite in phase to the vibrations in order to attenuate them. As an example, the resonant frequency of the inertial deflector is on the order of 5 to 50 Hz, preferably on the order of 12 Hz.

Note that although in the embodiment depicted, inertial deflector 1 is integrated into a hydrodynamic torque converter, it can also be integrated into other torque transmission devices. As an example, inertial deflector 1 can be integrated in particular into a dry clutch, support member 7 of inertial deflector 1 being fastened, for example, onto the hub of the clutch disk.

Referring to FIGS. 1 to 6, it is evident that inertia mass 8 is a one-piece annular part, made for example of cast iron. Inertia mass 8 has a radially oriented region 10 that is joined in elbow fashion to an axially oriented annular skirt 11 that extends axially from the outer periphery of radially oriented region 10.

Figure 3:
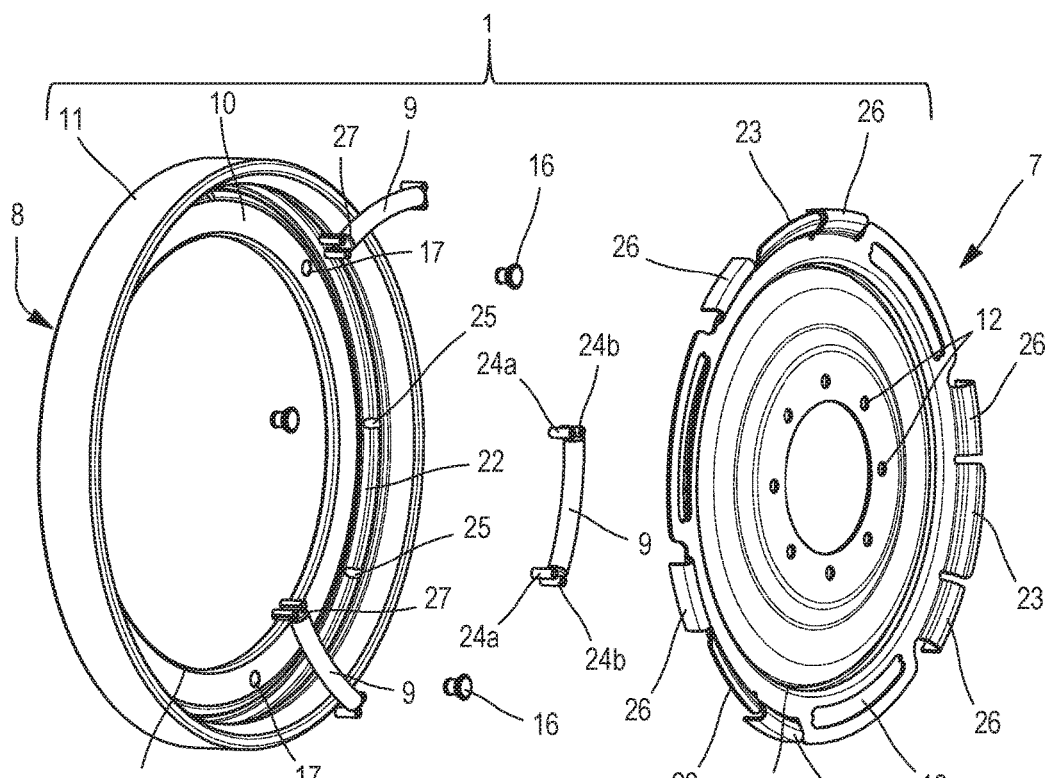
FIG. 3 is an exploded view of the inertial deflector of FIGS. 1 and 2.
Figure 4:
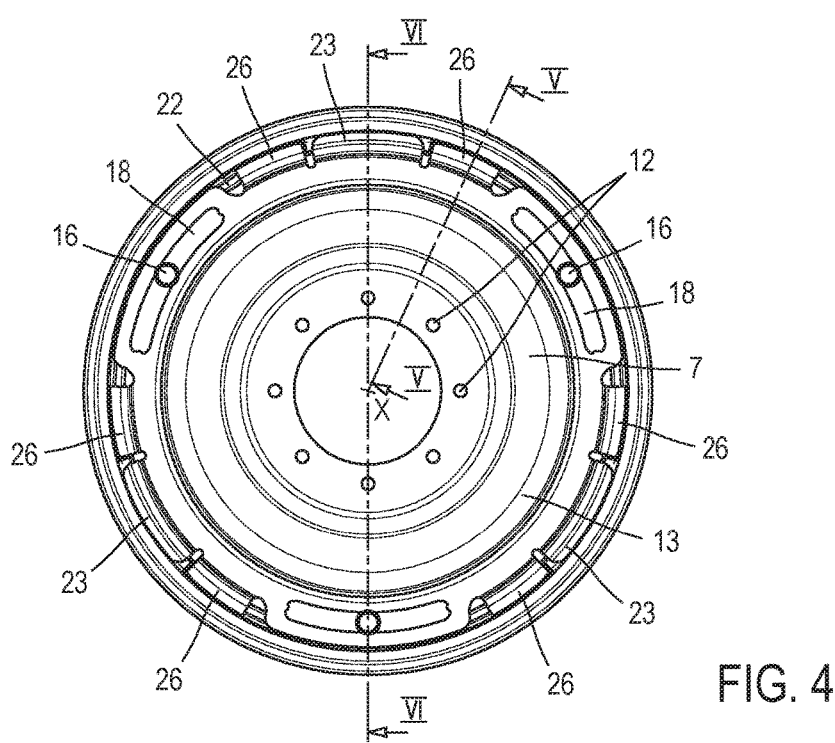
FIG. 4 is a plan view of the inertial deflector of FIGS. 1 to 3.
Figure 6:
FIG. 6 is a section view along plane VI-VI of FIG. 4.
Figure 6:
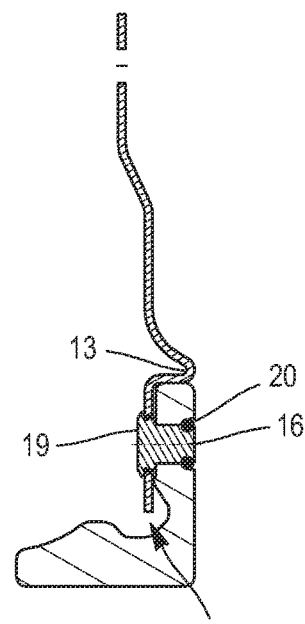

Support member 7 is an annular metal sheet that is fastened onto hub 3 of turbine 2 by means of a plurality of rivets passing through orifices 12 (depicted in FIGS. 3, 4, and 6).

As depicted in FIGS. 1, 2, 5, and 6, support member 7 has an indented annular zone 13 defining an axially oriented cylindrical guidance surface 14. This cylindrical guidance surface 14 interacts with a complementary cylindrical surface 15 constituted on the inner edge of radially oriented region 10 of inertia mass 8, allowing inertia mass 8 to be centered and rotationally guided on support member 7.

Helical springs 9, depicted in FIG. 3, are curved springs. They are arranged in a receiving space configured axially between inertia mass 8 and support member 7. To achieve this, inertia mass 8 has an annular channel 22 which extends circumferentially around the axis X and in which helical springs 9 are received in order to retain them radially and axially. Support member 7 furthermore has, in a rim zone, guidance fins 23 that end up covering annular channel 22 in the angular sectors in which helical springs 9 are located, in order to retain them axially in annular channel 22. As depicted in FIGS. 1 and 6, guidance fins 23 have a shape that is curved in a direction opposite to radial region 10 of inertia mass 8, in order to conform to the shape of helical springs 9.

Each helical spring 9 moreover is interposed circumferentially between two first abutment elements rotationally integral with inertia mass 8 and between two second abutment elements rotationally integral with support member 7, so that helical springs 9 establish a rotational coupling of inertia mass 8 and support member 7. For any relative rotation between inertia mass 8 and support member 7 from their relative rest position in one direction or the other, helical springs 9 thus exert a return force having a circumferential component which tends to bring inertia mass 8 and support member 7 back toward their relative rest position.

As depicted in FIG. 3, each first abutment element rotationally integral with inertia mass 8 is constituted here by a pair of axially oriented abutment pins 24a, 24b that are press-fitted into a bore 25 constituted in inertia mass 8. The two abutment pins 24a, 24b of each pair are spaced radially and abut respectively against the inner and outer edges of one of the ends of one of helical springs 9.

Figure 5:
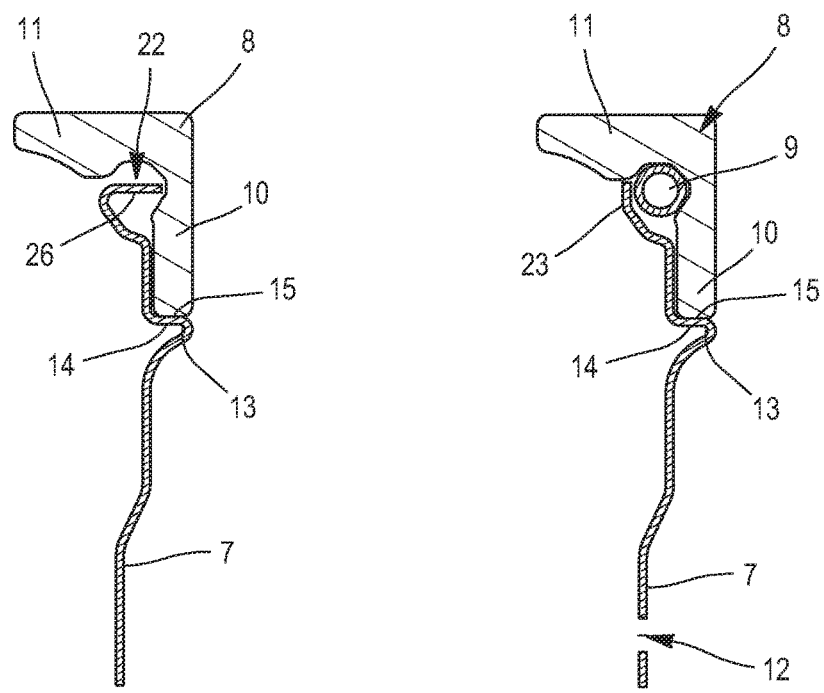
FIG. 5 is a half section view along plane V-V of FIG. 4.

In addition, each second abutment element rotationally integral with support member 7 is constituted by an abutment tab 26 configured at an outer border of support member 7. As depicted in FIGS. 3 and 4, support member 7 thus has two abutment tabs arranged respectively on either side of each of guidance fins 23. As depicted in FIG. 5, each abutment tab 26 is bent over so as to have an axial orientation, and is arranged radially between the two abutment pins 24a, 24b so that it can come into abutment against one of helical springs 9 at the central zone of one of its ends.

According to an embodiment each of the ends of helical springs 9 is equipped with an abutment cup 27 that has a body which extends inside the space delimited by the turns of the helical spring at the end thereof, and an abutment surface against which pins 24a, 24b and abutment tab 26 come into abutment.

Inertia mass 8 is furthermore retained axially on support member 7 by means of a plurality of cylindrically shaped pegs 16 depicted in particular in FIGS. 2, 3, 4, and 6. Pegs 16 extend in an axial direction parallel to the axis X, and each pass on the one hand through a smooth cylindrical bore 17 configured in radially oriented region 10 of inertia mass 8, and on the other hand through an opening 18 configured in support member 7. Each peg 16 has an end on the support member 7 side that is equipped with a head 19 axially retaining support member 7, and an end on the inertia mass 8 side that is equipped with an annular channel in which an elastic clip 20 is mounted for assembly purposes. Advantageously, inertia mass 8 has along the extension of each bore 17 a counterbore 21, for example conical in shape, allowing elastic clip 20 to be countersunk. Pegs 16 of this kind allow the production of threads inside bores 17 of inertia mass 8 to be dispensed with, which allows manufacturing costs to be decreased. Pegs 16 and inertia mass 8 moreover interact via smooth cylindrical surfaces, allowing the mechanical strength of pegs 16 to be optimized.

As depicted in FIGS. 3 and 4, each opening 18 extends in a circumferential direction around the axis X so as to permit a relative rotation of inertia mass 8 with respect to support member 7. Furthermore, in order to protect helical springs 9, openings 18 have dimensions such that pegs 16 come into abutment against the ends of openings 18 in order to limit the relative rotation of inertia mass 8 with respect to support member 7 before helical springs 9 are completely compressed, i.e. with their turns contiguous.

Inertial deflector 1 as described above has a simple structure having a limited number of elements. Note also that this inertial deflector has no friction device or hysteresis device allowing dissipation of the energy accumulated in helical springs 9 by exerting a resisting frictional torque acting against the relative deflection between inertia mass 8 and support member 7. The structure of this inertial deflector 1 is thereby further simplified. An inertial deflector 1 having no hysteresis device is specifically intended to be associated with a transmission system in which the combustion engine is a cylinder deactivation engine. An engine of this kind is capable of functioning in a "normal" mode in which all of its cylinders are activated, and in an economy mode in which only some of its cylinders are activated. In this context, on the one hand it is possible for the lowest resonant frequency of the deflector to be below the idle speed of the engine. On the other hand, the cylinder deactivation engine can be controlled in such a way that the inertial deflector is never excited at its highest resonant frequency in either the normal mode or the deactivated mode. Alternatively, it has also been noted that in certain cases, in particular when the inertial deflector is placed downstream from another torsional damper, the vibrations capable of exciting the inertial deflector at its highest resonant frequency are of low amplitude. In all the aforementioned instances, a hysteresis device allowing dissipation of the energy accumulated in the springs in the context of resonance phenomena of the inertial deflector thus becomes superfluous.

Figure 7:
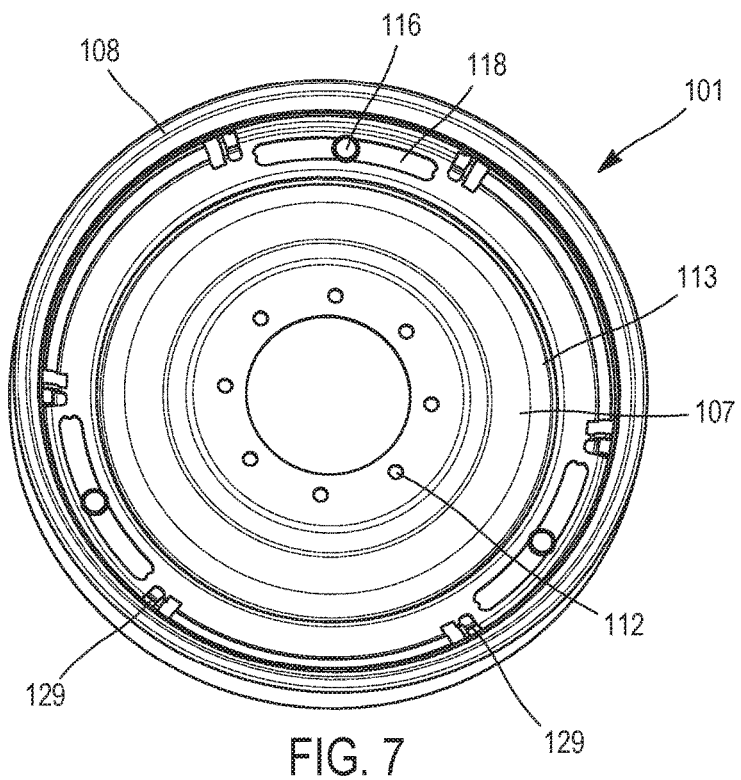
FIG. 7 is a plan view of an inertial deflector according to a second embodiment.
Figure 8:
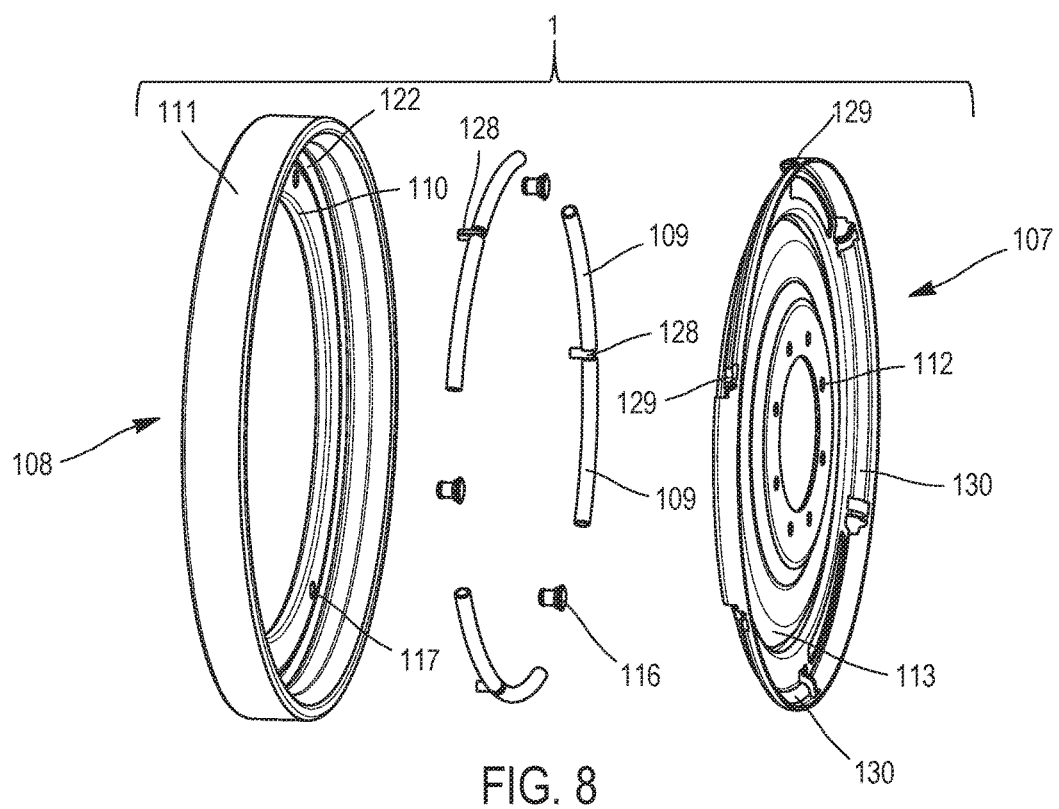
FIG. 8 is an exploded view of the inertial deflector of FIG. 7.

FIGS. 7 and 8 depict an inertial deflector according to a second embodiment. Elements identical or analogous to the elements of FIGS. 1 to 6 are labeled with the same reference number incremented by 100.

In this embodiment inertial deflector 101 has a plurality of pairs of helical springs 109, here three pairs.

An abutment element 128 integral with one element among inertia mass 108 and support member 107 is interposed between the mutually facing ends of two helical springs 109 of each pair, while two abutment elements 129 integral with the other element interact respectively with the opposite ends of one and the other of the two helical springs 109 of the pair. The two springs 109 of each of the pairs are thus capable of exerting circumferential return forces in two opposite directions. In addition, helical springs 109 are pre-stressed in the relative rest position between inertia mass 108 and support member 107. In other words, in the stable relative rest position helical springs 109 are compressed and exert forces that compensate for one another.

Upon a relative rotation between inertia mass 108 and support member 107 in one direction or the other from their relative rest position, one of helical springs 109 of each pair thus compresses while the other extends. Advantageously, the pre-stressing of helical springs 109 is such that inertia mass 108 and support member 107 each reach their maximum deflection position before the two helical springs 109 achieve their relaxed state. Thanks to such a configuration it is thus possible on the one hand to avoid angular clearances at the rest position of inertia mass 108 with respect to its support 107, and on the other hand to prevent the helical springs from compressing only above a certain amplitude threshold of the irregularities.

In the embodiment depicted, abutment elements 128 interposed between the mutually facing ends of two springs of each pair are each constituted by an abutment pin that is press-fitted into a bore configured on inertia mass 108. Support member 107 moreover has, in a rim zone, recesses 130 that end up covering annular channel 122 in the annular sectors in which helical springs 109 are located, in order to retain them axially in annular channel 122. Recesses 130 have a shape that is curved in a direction opposite to the radial portion of inertia mass 108, so as to conform to the shape of helical springs 109. The circumferential ends of each recess 130 have walls that abut against the ends of the two helical springs 109 of each pair, thus constituting the two aforesaid abutment elements 129.

Figure 9:
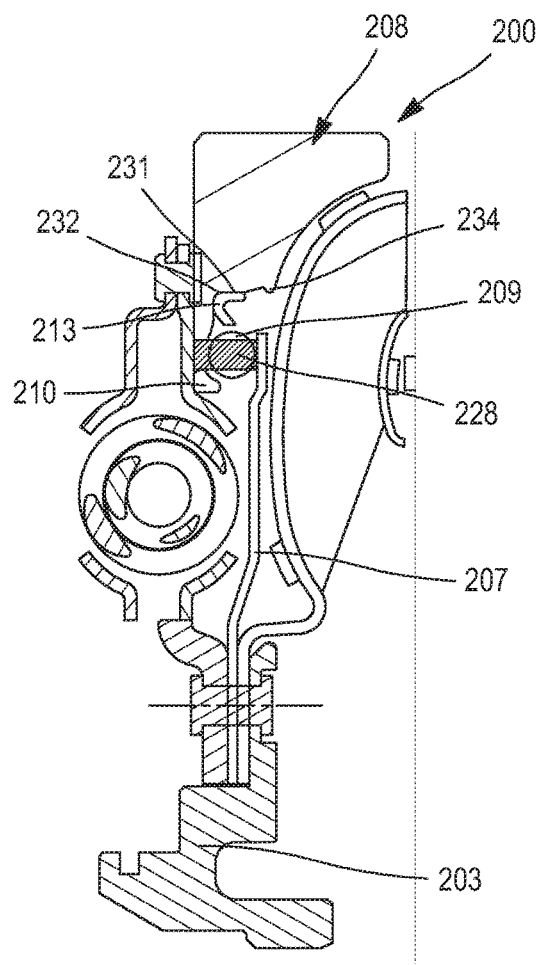
FIG. 9 is a half section view of an inertial deflector according to a third embodiment, integrated with a hydrodynamic torque converter.
Figure 10:
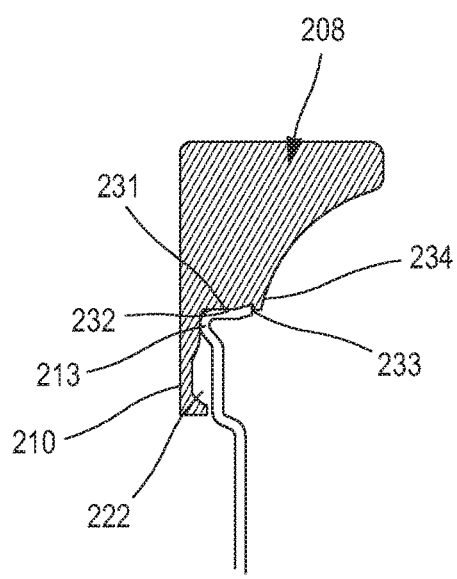
FIG. 10 is a partial section view of the inertial deflector of FIG. 9.

FIGS. 9 and 10 depict an inertial deflector 200 according to a third embodiment. Elements identical or analogous to the elements of FIGS. 1 to 6 are labeled with the same reference number incremented by 200.

This embodiment differs from the two preceding embodiments on the one hand in terms of how inertia mass 208 is rotationally guided on support member 207, and on the other hand in terms of how inertia mass 208 is retained axially on support member 207. Specifically, inertia mass 208 here has an axially oriented guidance surface 231 that is arranged above the space receiving helical springs 209 and interacts with a guidance surface 232 of support member 207. Guidance surface 232 of support member 207 is constituted by bending the outer peripheral edge of support member 207 in such a way that it extends axially. Guidance surfaces 231, 232 interact with one another, allowing inertia mass 208 to be centered and rotationally guided on support member 207.

Support member 207 furthermore has, along the extension of its guidance surface 232, a plurality of clippable tongues 233 intended to ensure axial retention of inertia mass 208 on support member 207. To achieve this, guidance surface 231 configured on inertia mass 208 is bordered axially by an annular bead 234 projecting radially inward with respect to the cylindrical guidance surface 231.

Tongues 233 are capable of elastically deforming radially inward so that support member 207 can end up being received between radially oriented region 201 of inertia mass 208 and annular bead 234, so that tongues 233 come into axial abutment against annular bead 234 to ensure that inertia mass 208 is retained axially on support member 207.

Figure 11:
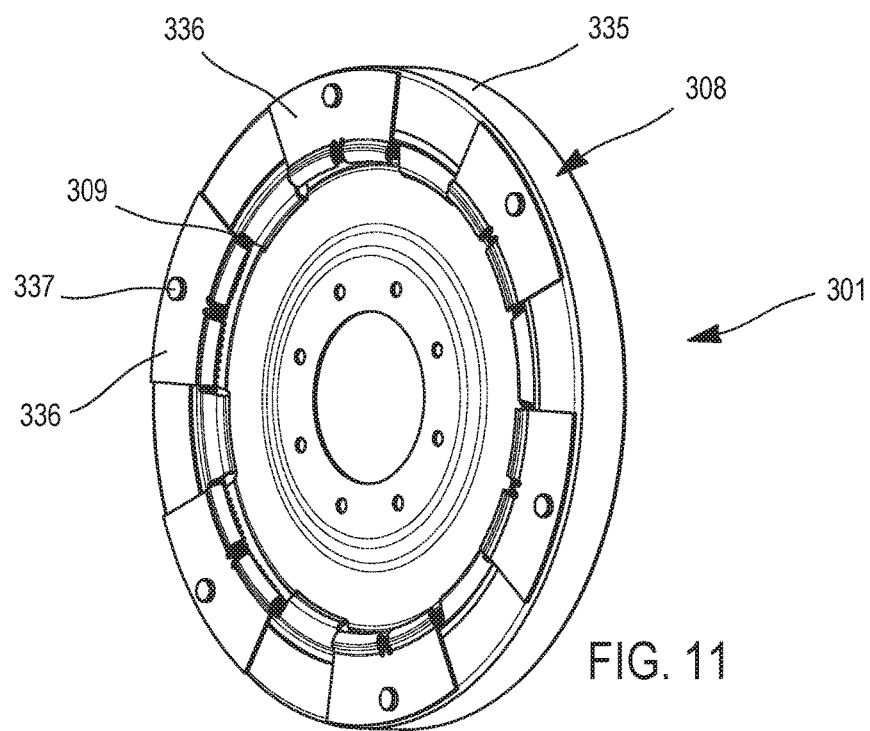
FIG. 11 is a perspective view of an inertial deflector according to a fourth embodiment.
Figure 12:
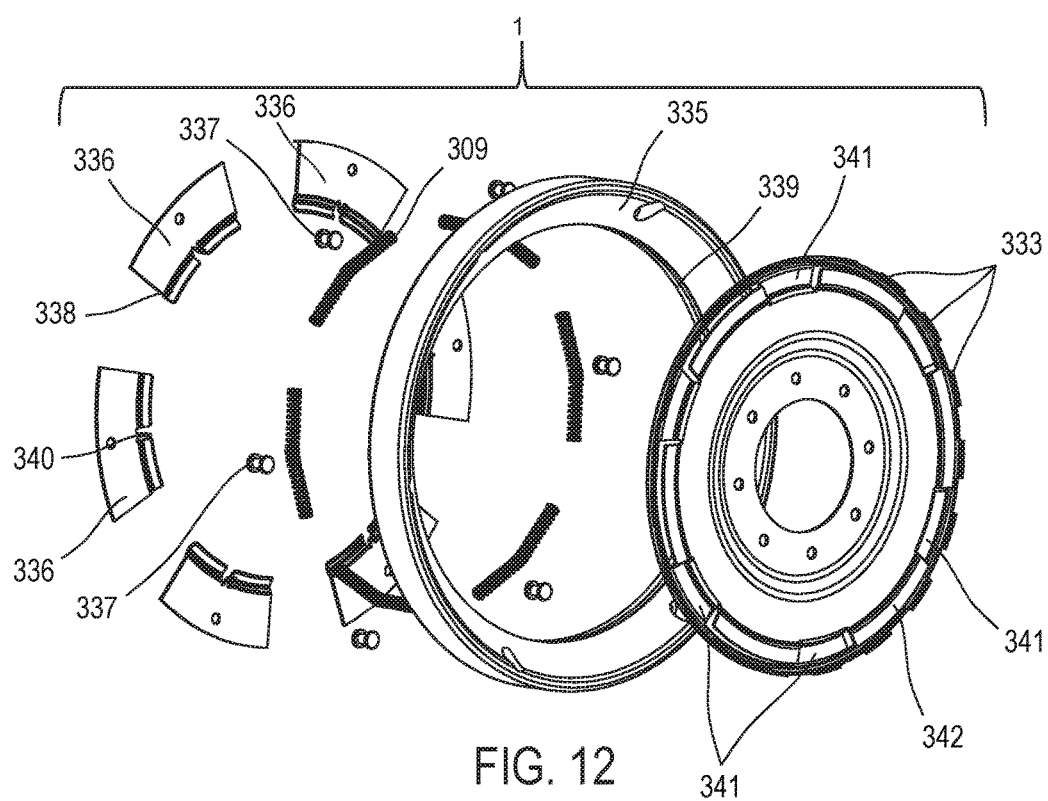
FIG. 12 is an exploded view of the inertial deflector of FIG. 11.

Lastly, FIGS. 11 and 12 depict an inertial deflector 301 according to a fourth embodiment. Elements identical or analogous to the elements of FIGS. 1 to 6 and of FIGS. 9 and 10 are labeled with the same reference number incremented respectively by 300 and by 100.

Inertial deflector 301 differs from the preceding embodiments in that inertia mass 308 is not constituted by a single one-piece part but has an annular part 335 made of cast iron and a plurality of sectors 336 made of sheet metal fastened to said annular part 335.

Sectors 336 extend radially and are each fastened, close to their radially outer end, to annular part 335, for example by means of a rivet 337. Each sector 338 has an indented zone that constitutes, with inner edge 339 of annular part 305, a recess of inertia mass 308 in which springs 309 are axially and radially guided. Support member 307 furthermore has guidance fins 342 that end up covering the angular sectors in which helical springs 309 are located, in order to retain them axially.

In FIGS. 11 and 12 helical springs 309 are associated pairwise as in the embodiment of FIGS. 7 and 8. A bent-over abutment tab 340 is constituted in each of sectors 336 and is interposed between the two helical springs 309 of each pair. Support member 307 moreover has, on either side of each of guidance fins 342, abutment tabs 341 that interact with the opposite ends of the two helical springs 309 of each pair. In a rest position, each helical spring 309 is thus pre-stressed between an abutment tab 340 integral with inertia mass 308 and an abutment tab 341 integral with support member 307.

Although the invention has been described in conjunction with several specific embodiments, it is quite apparent that it is in no way limited thereto and that it encompasses all technical equivalents of the means described as well as combinations thereof, if they are within the context of the invention.

Use of the verb "have," "comprise," or "include," and of conjugated forms thereof, does not exclude the presence of elements or steps other than those set forth in a claim. Use of the indefinite article "a" or "an" for an element or step does not, unless otherwise indicated, exclude the presence of a plurality of such elements or steps.

In the claims, any reference character in parentheses cannot be interpreted as a limitation of the claim.

The invention claimed is:

1. An inertial deflector (1, 101, 201, 301) for a motor vehicle transmission system, the inertial deflector comprising:
a support member (7, 107, 207, 307) intended to be associated with an element (3, 203) of the transmission system and to be driven rotationally around an axis X, the support member (7, 107, 207, 307) including a rim zone (23, 130, 342);
an inertia mass (8, 108, 208, 308) mounted rotationally movably on the support member (7, 107, 207, 307) around the axis X, the inertia mass (8, 108, 208, 308) including a recess (22, 122, 222, 338) therein; and
helical springs (9, 109, 209, 309) arranged along a circumferential direction and elastically rotationally coupling the support member (7, 107, 207, 307) and the inertia mass (8, 108, 208, 308);
at least one of the helical springs (9, 109, 209, 309) disposed in the recess (22, 122, 222, 338) between the inertia mass (8, 108, 208, 309) and the rim zone (23, 130, 342) of the support member (7, 107, 207, 307);
the recess and the rim zone being configured with respect to one another to retain the at least one of the helical springs in the recess (22, 122, 222, 338);
each of the helical springs (9) interposed circumferentially between two first abutment elements (24a, 24b) rotationally integral with the inertia mass (8) and between two second abutment elements (26) rotationally integral with the support member (7);
each of the two first abutment elements (24a, 24b) includes a pair of axially oriented abutment pins spaced radially from one another and press-fitted into a bore (25) provided in the inertia mass (8);
each of the two second abutment elements is an abutment tab (26) having an axial orientation and arranged radially between the two abutment pins of one of the pairs of the abutment pins.

2. The inertial deflector according to claim 1, wherein each of the helical springs is disposed in the recess (22, 122, 222, 338) between the inertia mass (8, 108, 208, 309) and the rim zone (23, 130, 342) of the support member (7, 107, 207, 307), wherein the recess in the inertia mass guides each of the helical springs radially and axially, and wherein the rim zone covers the recess (22, 122, 222, 338) in order to axially retain the helical springs (9, 109, 209, 309) in the recess.

3. The deflector according to claim 2, wherein the recess in the inertia mass (8, 108, 208) includes an annular channel (22, 122, 222) extending circumferentially around the axis X.

4. The deflector according to claim 2, wherein the inertia mass (8, 108, 208) is a one-piece part.

5. The inertial deflector according to claim 2, wherein the inertia mass (308) has an annular part (335) and a plurality of sectors (336) of sheet metal fastened to the annular part (335) and extending radially, and wherein each of the sectors (336) has an indented zone (338) constituting, with an inner edge (339) of the annular part (335), the recess of the inertia mass (308).

6. The inertial deflector according to claim 1, wherein the recess in the inertia mass (8, 108, 208) includes an annular channel (22, 122, 222) extending circumferentially around the axis X.

7. The deflector according to claim 6, wherein the inertia mass (8, 108, 208) is a one-piece part.

8. The inertial deflector according to claim 1, wherein the inertia mass (8, 108, 208) is a one-piece part.

9. The inertial deflector according to claim 1, wherein the inertia mass (308) has an annular part (335) and a plurality of sectors (336) of sheet metal fastened to the annular part (335) and extending radially, and wherein each of the sectors (336) has an indented zone (338) constituting, with an inner edge (339) of the annular part (335), the recess of the inertia mass (308).

10. The inertial deflector according to claim 1, wherein the support member (7, 107, 207, 307) has an indented annular zone (13, 113, 213) defining an axially oriented guidance surface (31, 131, 231), and wherein the guidance surface (14, 232) interacts with a complementary guidance surface (15, 231) constituted on an inner edge of the inertia mass (8, 108, 208, 308) so as to center and rotationally guide the inertia mass (8, 108, 208, 308) on the support member (7, 107, 207, 307).

11. The inertial deflector according to claim 1, wherein the inertia mass (8, 108) is retained axially on the support member (7, 107) by a plurality of pegs (16, 116) each passing through a cylindrical bore (17) provided in the inertia mass (8) and a circumferentially oriented opening (18, 118) provided in the support member (7, 107).

12. The inertial deflector according to claim 11, wherein each of the pegs (16, 116) has a first end provided with a head (19) and a second end provided with an annular channel in which an elastic clip (20) is mounted, and wherein the inertia mass (8, 108) and the support member (7, 107) are sandwiched between the head (19) and the elastic clip (20).

13. The inertial deflector according to claim 1, wherein the support member (207) has, along an extension of a guidance surface (232), a plurality of tongues (233); and wherein a guidance surface (231) provided on the inertia mass (208) is bordered axially by an annular bead (234) projecting radially inward and interacting with the tongues (233) in order to axially retain the inertia mass (208) on the support member (207).

14. The inertial deflector according to claim 1, wherein the helical springs (109, 309) are associated pairwise, wherein each of the helical springs (109, 309) has a first end facing the other helical spring of the pair of helical springs and a second opposite end, wherein an abutment element (128, 340) integral with one of the inertia mass (8) and the support member (7) is interposed between the first ends of the helical springs (109, 309) of each pair of the helical springs, and two abutment elements (26, 341) rotationally integral with another of the inertia mass (8) and the support member (7) interacting respectively with the second ends of the helical springs of each pair of the helical springs, wherein each of the helical springs (9) are pre-stressed between a first abutment element (128, 340) rotationally integral with the inertia mass (108, 308) and a second abutment element (26, 341) rotationally integral with the support member (107, 307).

15. A torque transmission device intended to transmit a torque between a crankshaft and an input shaft of a gearbox, the torque transmission device comprising an inertial deflector (1, 101, 201, 301) according to claim 1.

16. The torque transmission device according to claim 15, further comprising a hub (3, 203) having splines intended to interact with complementary splines configured on the input shaft of the gearbox; wherein the support member (7, 107, 207, 307) is fastened to the hub (3, 203).

17. A transmission system comprising:
a transmission device according to claim 15; and
a cylinder deactivation engine, wherein the inertial deflector (1, 101, 201, 301) has no friction device configured to exert a resisting frictional torque acting against the relative deflection between the inertia mass (8, 108, 208, 308) and the support member (7, 107, 207, 307).

* * * * *